(12) United States Patent
Ebitani et al.

(10) Patent No.: US 8,599,401 B2
(45) Date of Patent: Dec. 3, 2013

(54) IMAGE PROCESSING DEVICE, IMAGE PROCESSING SYSTEM, AND COMPUTER READABLE MEDIUM

(75) Inventors: Kenji Ebitani, Kanagawa (JP); Hirofumi Komatsubara, Kanagawa (JP); Takeshi Noguchi, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 412 days.

(21) Appl. No.: 13/086,778

(22) Filed: Apr. 14, 2011

(65) Prior Publication Data
US 2012/0113455 A1    May 10, 2012

(30) Foreign Application Priority Data
Nov. 4, 2010 (JP) .................................. 2010-247257

(51) Int. Cl.
*G06K 15/00* (2006.01)
*G06K 9/00* (2006.01)
*G06K 9/72* (2006.01)
*H04N 1/00* (2006.01)

(52) U.S. Cl.
USPC .......... 358/1.14; 358/406; 382/162; 382/167; 382/181; 382/231

(58) Field of Classification Search
None
See application file for complete search history.

(56) References Cited

U.S. PATENT DOCUMENTS

| | | | | |
|---|---|---|---|---|
| 5,652,412 A | * | 7/1997 | Lazzouni et al. | .......... 178/18.01 |
| 5,661,506 A | * | 8/1997 | Lazzouni et al. | ............. 345/179 |
| 2007/0023523 A1 | | 2/2007 | Onishi | |
| 2007/0112841 A1 | * | 5/2007 | Iwayama et al. | .............. 707/102 |
| 2007/0242305 A1 | | 10/2007 | Onishi | |
| 2008/0005028 A1 | * | 1/2008 | Wakabayashi et al. | .......... 705/51 |
| 2008/0013113 A1 | * | 1/2008 | Gonzalez et al. | ............... 358/1.5 |
| 2008/0066973 A1 | | 3/2008 | Furuki | |
| 2008/0089586 A1 | * | 4/2008 | Igarashi et al. | ................ 382/187 |
| 2008/0141117 A1 | | 6/2008 | King et al. | |
| 2008/0192297 A1 | | 8/2008 | Wang et al. | |
| 2008/0304891 A1 | | 12/2008 | Saijo et al. | |
| 2009/0268249 A1 | * | 10/2009 | Ikeda et al. | ................... 358/1.18 |

FOREIGN PATENT DOCUMENTS

| | | |
|---|---|---|
| JP | 06-075795 A | 3/1994 |
| JP | 06-103390 A | 4/1994 |
| JP | 09-030054 A | 2/1997 |
| JP | 09-300711 A | 11/1997 |
| JP | 2007-288285 A | 11/2007 |
| JP | 2008-305137 A | 12/2008 |
| WO | 2006/119533 A1 | 11/2006 |

OTHER PUBLICATIONS

Communication from the Australian Patent Office issued Feb. 27, 2013 in counterpart Australian Application No. 2011202057.

* cited by examiner

*Primary Examiner* — Marivelisse Santiago Cordero
*Assistant Examiner* — Moustapha Diaby
(74) *Attorney, Agent, or Firm* — Sughrue Mion, PLLC (57) ABSTRACT

An image processing device includes an analysis result reception unit, an inclination reception unit, a date and time reception unit, a date and time extraction unit, a determination unit, an adjustment unit, an information image generation unit, and an output unit. The analysis result reception unit receives an analysis result of an information image scanned by an information image scan unit. The inclination reception unit receives inclination when the information image scan unit scans the information image. The date and time reception unit receives a date and time when the information image scan unit scans the information image. The date and time extraction unit extracts a date and time when the information image scanned by the information image scan unit is printed. The determination unit determines whether or not to adjust a size of a pixel cluster constituting the information image.

6 Claims, 10 Drawing Sheets

PATTERN 0

FIG. 4C

PATTERN 1

IMAGE PROCESSING DEVICE, IMAGE PROCESSING SYSTEM, AND COMPUTER READABLE MEDIUM

CROSS-REFERENCE TO RELATED APPLICATIONS

This application is based upon and claims priority under 35 USC 119 from Japanese Patent Application No. 2010-247257, filed Nov. 4, 2010.

BACKGROUND

1. Technical Field

The present invention relates to an image processing device, an image processing system, and a computer readable medium.

2. Related Art

There is a technology for controlling output of an information image.

SUMMARY OF THE INVENTION

According to an aspect of the invention, an image processing device includes an analysis result reception unit, an inclination reception unit, a date and time reception unit, a date and time extraction unit, a determination unit, an adjustment unit, an information image generation unit, and an output unit. The analysis result reception unit receives an analysis result of an information image scanned by an information image scan unit. The inclination reception unit receives inclination when the information image scan unit scans the information image. The date and time reception unit receives a date and time when the information image scan unit scans the information image. The date and time extraction unit extracts a date and time when the information image scanned by the information image scan unit is printed. The determination unit determines whether or not to adjust a size of a pixel cluster constituting the information image, based on whether the date and time received by the date and time reception unit is within a predetermined time period from the date and time extracted by the date and time extraction unit. The adjustment unit, when the determination unit determines that the size of the pixel cluster should be adjusted, adjusts the size of the pixel cluster constituting an information image based on an at least one of the analysis result received by the analysis result reception unit or and inclination received by the inclination reception unit. The information image generation unit generates an output information image constituted by the pixel cluster adjusted by the adjustment unit. The output unit outputs a document in which the output information image generated by the information image generation unit is combined.

BRIEF DESCRIPTION OF THE DRAWINGS

Exemplary embodiments of the invention will be described in detail based on the following figures, wherein:

FIGS. 10A to 10C8 are explanation views showing examples for adjustment of a size of a pixel cluster.

DETAILED DESCRIPTION

Hereinafter, a preferable exemplary embodiment to accomplish the present invention will be described based on the drawings.

Figure 1:
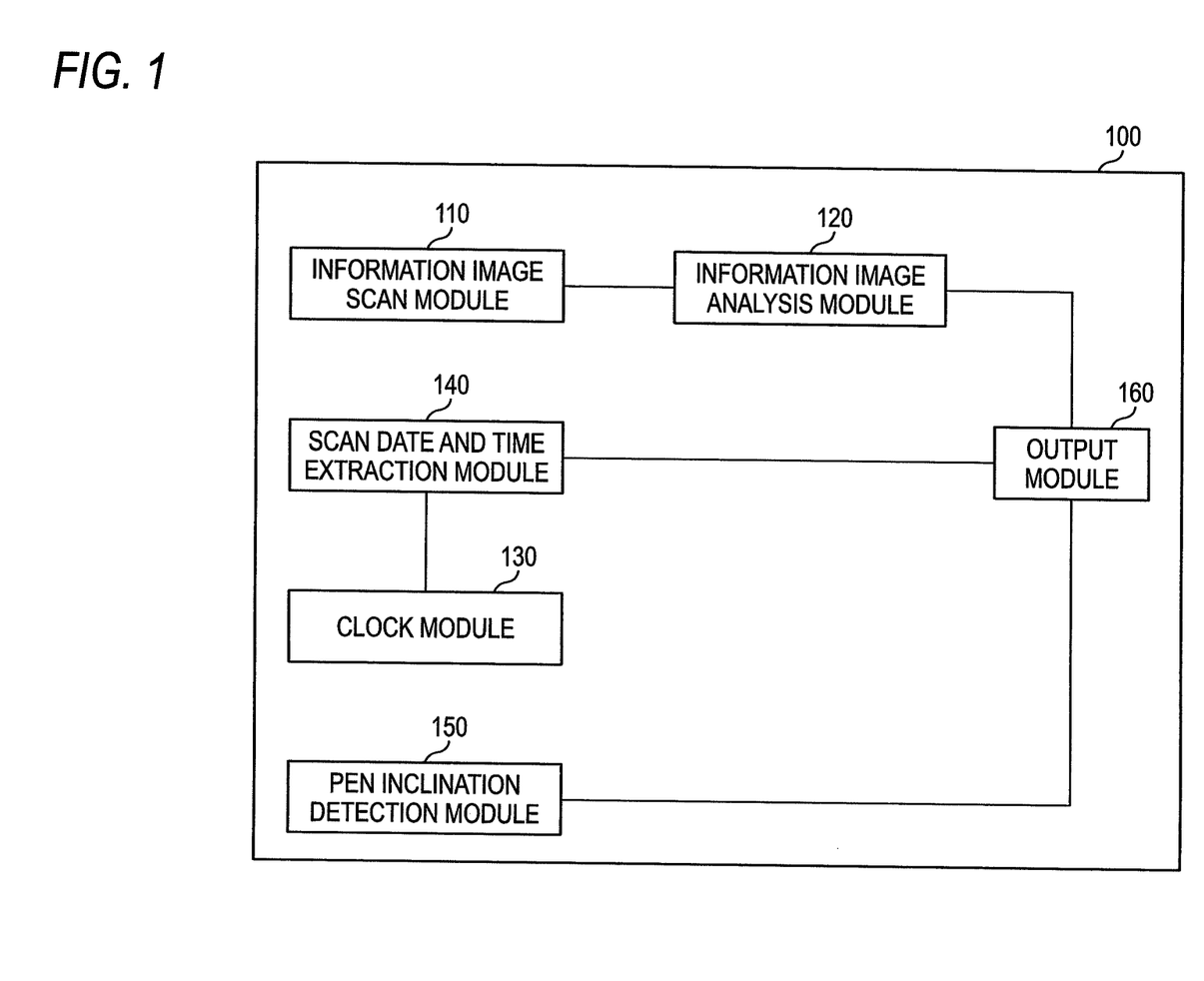
FIG. 1 is a conceptual module configuration view for a configuration example of an exemplary embodiment (digital pen) of the present invention.

FIG. 1 shows a conceptual module configuration view for a configuration example of an exemplary embodiment (digital pen) of the present invention.

Meanwhile, a module generally indicates a component, which can be logically separated, such as software (computer program) and hardware. Accordingly, a module in an exemplary embodiment of the present invention indicates a module in a hardware configuration, as well as a module in a computer program. Thus, an exemplary embodiment of the present invention includes explanation of a computer program (program for executing each sequence in a computer, program for enabling a computer to function as each means, and program for accomplishing each function in a computer), a system, and a method for functioning the modules. For explanation convenience, "store," "enable . . . to store," and their equivalent wordings will be used. However, if an exemplary embodiment of the present invention relates to a computer program, the wordings mean storage in a storage device or control for storage in a storage device. A module may have a one-to-one corresponding function. However, in terms of mounting a module, one module may constitute one program, or a plurality of modules may constitute one program. In reverse, one module may constitute a plurality of programs. A plurality of modules may be executed by one computer, or one module may be executed by a plurality of computers under a dispersion or parallel environment. Meanwhile, one module may include another module. Hereinafter, "connection" is also used in case of logical connection (transmission and reception of data, commands, reference relationship between data, and others), in addition to physical connection. "Predetermined" means being predetermined prior to a targeted process. In case of being prior to a targeted process, even after start of processes according to an exemplary embodiment of the present invention, the meaning of "predetermined" includes being predetermined according to a circumstance/state at that time or a circumstance/state until the present.

A system or device includes a system or device accomplished by one computer, hardware, device, or the like, in addition to a system or device wherein a plurality of computers, hardware, devices, or the like are connected by a communication means such as a network (including one-to-one corresponding communication connection). Herein, a "device" and a "system" have the same meaning. Of course, the "system" does not include a social "structure" (social system), which is nothing but an artificial promise.

For each process by each module or each process in the case where a plurality of processes are executed in a module, targeted information is read from a storage device to execute the process. Thereafter, a process result is stored in the storage device. Accordingly, explanation of reading information from the storage device prior to the process and storing a process result in the storage device after the process may be omitted. Meanwhile, the storage device may include a hard disc, an RAM (Random Access Memory), an external storage medium, a storage device using a communication circuit, a resistor in a CPU (Central Processing Unit), and others.

The digital pen 100 of an exemplary embodiment of the present invention scans an information image. As illustrated in an example of FIG. 1, the digital pen 100 has an information image scan module 110, an information image analysis module 120, a clock module 130, a scan date and time extraction module 140, a pen inclination detection module 150, and an output module 160.

Figure 4A:
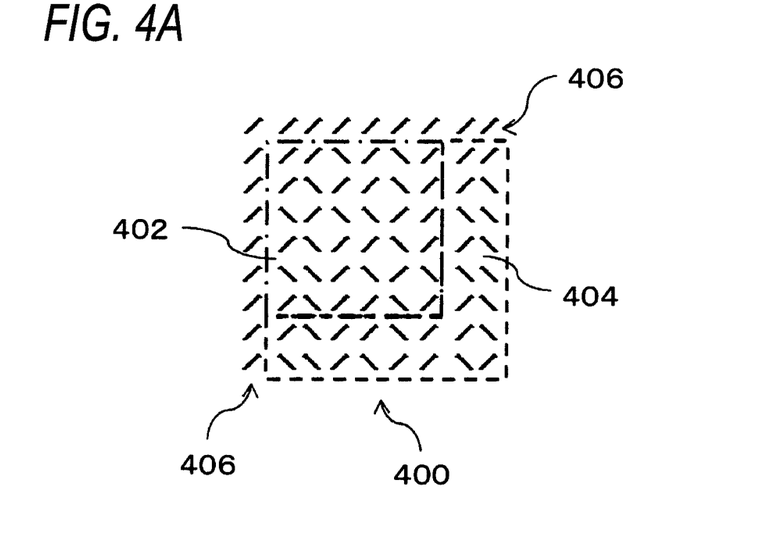
FIGS. 4A to 4C are explanation views showing an example of an information image.
Figure 4B:
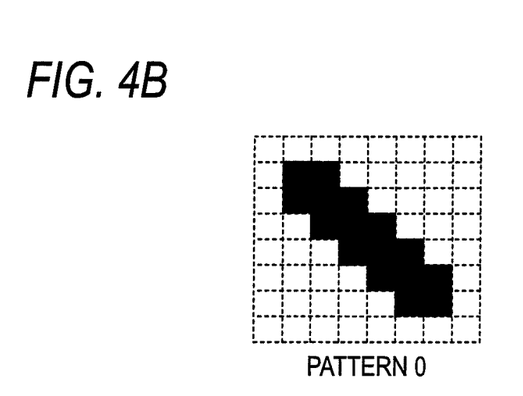
Figure 4C:
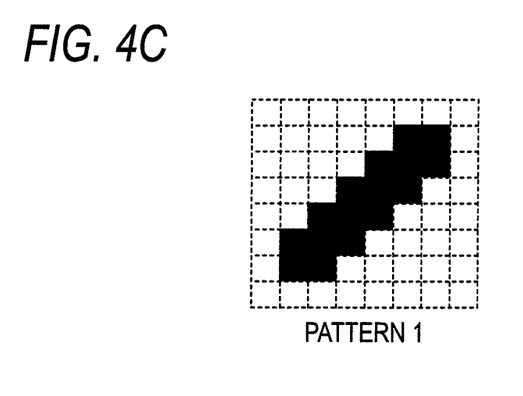

An information image means an image code systemically made to display electronic data in the form that can be scanned by a machine. As a specific example, an example of FIGS. 4A to 4C will be described. FIGS. 4A to 4C are explanation views showing an example for an information image.

The example relates to a 2-dimensional code pattern image using a glyph code, which was developed by the Palo Alto Research Center of the US Xerox corporation to express data with diagonal lines having different angles, as a code symbol, which is an information image.

In the example, a unit area 400 is a square area of 8 symbols×8 symbols. A value of each of the symbols is expressed by a diagonal pattern as illustrated in FIGS. 4B and 4C. In the example, a symbol value 0 is expressed by a diagonal line (pattern 0 in the example of FIG. 4B), which descends toward a lower right side forming a 45° angle in the counter-clockwise direction to the vertical line. A symbol value 1 is expressed by a diagonal line (pattern 1 in the example of FIG. 4C), which ascends toward an upper right side forming a 45° angle in the clockwise direction to the vertical line.

A location code image 402 is a square image of 6 symbols×6 symbols in an upper left corner of the unit area 400. An identification code image 404 is an image of the rest inverse L-shaped area obtained by subtracting the square of the 6×6 symbols from the unit area 400.

In the example, rows and lines of synchronization codes 406 are provided in the vertical and horizontal directions, respectively, along the circumference of the unit area 400. In the example, the synchronization codes 406 are formed by arranged diagonal symbols ("1") ascending toward a right side. A size and an arrangement pitch of the symbol are the same as the symbol size and pitch in the unit area 400. The synchronization codes 406 are vertically and horizontally provided with an equal interval. Each of the unit areas 400 is provided in a square area surrounded by the synchronization codes 406. The synchronization codes 406 indicate separation of each of the unit areas 400. That is, in a device scanning a 2-dimensional code pattern image, when rows and lines formed with consecutive symbols ascending toward a right side are detected, the inside of a frame formed by the rows and the lines of the consecutive symbols is recognized as the unit area 400. The symbols of 6×6 in the lower left corner of the unit area 400 may be recognized as the location code image 402.

Meanwhile, the synchronization codes 406 may not be the same as the example of FIG. 4A if they may identify location of the unit area 400 or the location code image 402. For example, the synchronization codes 406 may be codes, in which symbols having different shapes from diagonal symbols are arranged in the four corners of the unit area 400. For the synchronization codes 406, the example of FIG. 4A uses lines and rows having a width as wide as one symbol. However, if a mark constituting the synchronization codes 406 is sufficiently small, the unit areas 400 may be 2-dimensionally arranged without leaving intervals, and the mark may be disposed in a space of the adjacent unit area 400.

In the example of FIG. 4A, a total of 36 symbols, i.e., 36 bit data are stored in one location code image 402. Among the 36 bits, 18 bits may be used for encoding an x coordinate, and the other 18 bits may be used for encoding a y coordinate. If both the 18 bits and the other 18 bits are used for encoding location, 2^18 types (approximately 260,000 types) of locations may be encoded. If each of the diagonal patterns is configured by 8 pixels×8 pixels as illustrated in the example of FIGS. 4B and 4C, when the patterns are printed at 600 dpi (dot per inch), vertical and horizontal length of the 2-dimensional codes (including the synchronization codes 406) of FIG. 4A will become approximately 3 mm (=8 pixels per symbol×9 symbols×0.0423 mm), since vertical and horizontal length of one dot of 600 dpi is 0.0423 mm. If the 260,000 types of locations are encoded with 3 mm intervals, approximately 786 m length may be encoded. If good scanning accuracy is assured, all the 18 bits may be used for encoding location. However, if there is a scanning error problem, it is preferable to include redundant bits for error detection or correction. If a proportion of redundant bits in the 18 bits increases, the capability for error detection or correction increases. However, a range of location that can be expressed is reduced.

In the example of FIG. 4A, the identification code image 404 is disposed in a rectangular area of 2 bits×8 bits and a rectangular area of 2 bits×6 bits, and can store a total of 28 bits of identification information or others. If bits are used for identification information or others, approximately 270 million types (2^28 types) of identification information may be expressed. However, some of the 28 bits may be redundant bits for error detection or correction so as to overcome a scanning error. Meanwhile, as the identification information or others, an exemplary embodiment of the present invention may include a printing medium ID (Identification), a document ID, a page ID, and others for uniquely identifying a printing medium (paper document). The identification code images 404 in the unit areas 400, which are printed in a writing section of one paper, are the same. Of course, since location information displayed by the location code images 401 in the unit areas 400 indicates locations within the paper, the location code images 402 in the unit areas 400 are different.

In the above example, one bit of data have been expressed with the symbol 1 by using two diagonal patterns having 90° different angles as symbols. However, the example is illustrative only. For example, if patterns of vertical lines and horizontal lines are added to symbols, it is possible to express 2 bits of information with the symbol 1. In this manner, it is possible to increase the number of bits that can be expressed with the symbol 1, by increasing angle types of the diagonal pattern of the symbol 1. In addition, information images other than the glyph code may be used.

The digital pen 100 (also referred to as a scanner pen or an electronic pen) also has a function of a pen. The digital pen 100 performs writing on a printout document (paper document), in which an information image is combined, and scans an information image positioned at the location written at that time. The digital pen 100 extracts the handwriting as stroke information to transmit the information to another information processing device. The information processing device performs processes such as reflection in an original electronic document by using the stroke information. Meanwhile, the stroke information means information expressed a series of coordinates obtained by performing writing on a document having an information image with the digital pen 100. This will be described below by using the example of FIG. 5.

Figure 5:
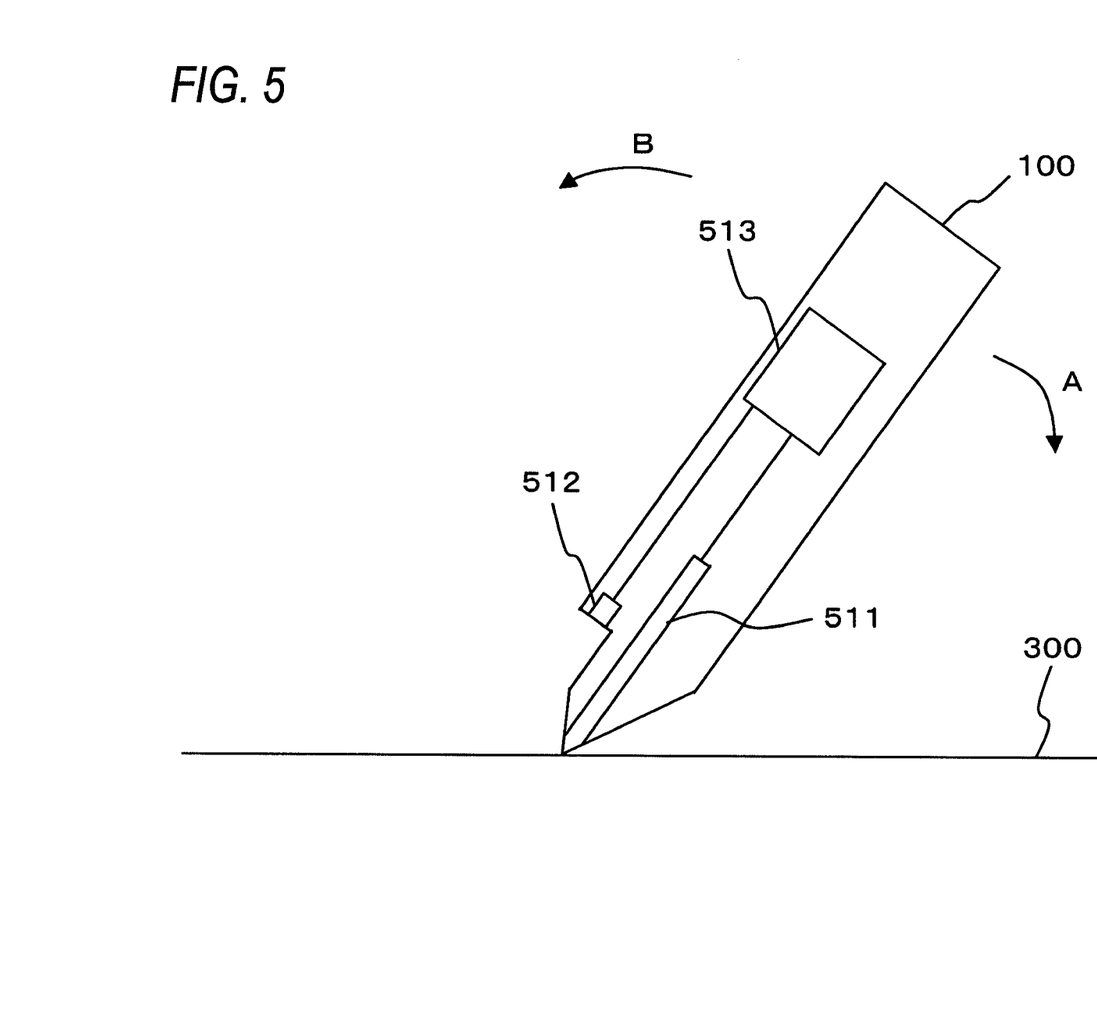
FIG. 5 is an explanation view showing a structure example of a digital pen.

FIG. 5 is an explanation view showing a structure example of the digital pen 100. The digital pen 100 has a lead 511, an image scan module 512, and a control/transmission module 513.

According to operation of the digital pen 100 by a user, characters or others are written by the lead 511 on an information image area document 300. The image scan module 512 consecutively performs imaging at a relatively high speed, for example, approximately dozens to one hundred and dozens of frames per second. The image scan module 512 scans each of the frames, and then outputs the scanned image to the control/transmission module 513. The control/transmission module 513 detects the synchronization codes 406 from the image scanned by the image scan module 512. In case of the same code pattern image as the example of FIG. 4A, lines and rows, in which a diagonal pattern ascending toward a right side are consecutively presented, are detected as lines and rows of the synchronization codes 406. Meanwhile, for the synchronization codes, various synchronization codes, which have been conventionally suggested, in addition to the example of FIG. 4A, may be used. The synchronization codes may be detected by a conventional detection method according to a type of the synchronization codes.

The location code image 402 and the identification code image 404 are extracted from the scanned image. The control/transmission module 513 executes a code recognition process for the location code image 402 and the identification code image 404 to replay location information, identification information, and others. Generally speaking, the code recognition process is an inverse process of an information image generation process. In case of the identification code image 404 as a representative example, the control/transmission module 513 first recognizes each diagonal symbol from the identification code image 404, thereby obtaining a value of the symbol. And, the control/transmission module 513 obtains an identification code matrix, in which the value of each symbol is arranged in correspondence of arrangement location of each symbol in the identification code image 404. The control/transmission module 513 obtains a serial identification code for the identification code matrix, and executes a decoding process for the identification code in correspondence with an encoding method to decode identification information. Location information for the location code image 402 may also be decoded by equivalent processes. The extraction and recognition processes described above are performed for one frame to obtain location information, identification information, and others.

The location information and the identification information obtained from the scanned image of each frame as described above are provided to an information processing device using the information. For example, in case of an information processing device reading writings by an operator with the digital pen 100 on a paper, on which an information image is printed, as electronic information, the device identifies the paper from the identification information to acquire an original document of the paper, obtains a trace of the writings by the operator from the location information acquired from each of the consecutively scanned frames, overlaps the image presenting the trace with the original document to record the image, and other processes.

In the case where the information image area document 300 is scanned at an angle according to the example of FIG. 5, the digital pen 100 may analyze the information image with good accuracy. However, there is a case where inclination occurs in an A or B direction as exemplified in FIG. 5 depending on how the user holds the digital pen 100. If an angle of inclination in the A or B direction increases, a size of a pixel cluster (dot) constituting an information image affects extraction of information from the information image. For example, if the digital pen 100 is inclined in the A direction, an image lacks a light quantity. In that case, as a pixel cluster is small, recognizing the pixel cluster becomes difficult. For example, if the digital pen 100 is inclined in the B direction, an image may easily have a blurred point. In that case, a large pixel cluster causes the blurred image. Further, a boundary between pixel clusters becomes unclear. As a result, recognizing the pixel cluster becomes difficult. In addition, how to hold the digital pen 100 may be attributed to a user's habit, which may not be corrected by force. In such case, a size of a pixel cluster may be adjusted in compliance with the user (inclination of the digital pen 100 in use).

Meanwhile, there is a case where printing accuracy of a pixel cluster constituting an information image printed on the information image area document 300 is ununiformed due to an environment (temperature, moisture, or others) upon the printing or variation with time (light quantity or others) of a printer. Especially, the ununiformity mostly occurs in a printer using an electrophotography method. In that event, there is a case where extracting information from an information image scanned by the digital pen 100 becomes difficult. As such, assessing a pixel cluster by outputting a chart for assessment and scanning the chart by means of a printer, and reflecting the result in the printer are conducted. In this method, the reflection is possible only when assessment is conducted. If assessment is not frequently conducted, reflection in the printer is impossible, despite of variation of the state of the printer. If there are a plurality of printers, assessment should be performed for each of the printers. In an exemplary embodiment of the present invention, a size of a pixel cluster is adjusted by using a result in the case where a printer is actually used by a user.

The relationship between each module in the digital pen 100 according to the example of FIG. 1 and each module in the digital pen 100 according to the example of FIG. 5 will be described.

The information image scan module 110 according to the example of FIG. 1 is realized by the image scan module 512 according to the example of FIG. 5. The information image analysis module 120, the clock module 130, the scan date and time extraction module 140, the pen inclination detection module 150, and the output module 160 according to the example of FIG. 1 are realized by the control/transmission module 513 according to the example of FIG. 5.

The information image scan module 110 is connected to the information image analysis module 120. The information image scan module 110 scans an image positioned at location written by the digital pen 100. When an information image is combined in a document, on which writing is performed, and the writing is performed on the location where the information image is positioned, the information image scan module 110 scans the information image, and transmits the scanned image to the information image analysis module 120.

The information image analysis module 120 is connected to the information image scan module 110 and the output module 160. The information image analysis module 120 receives the image scanned by the information image scan module 110 and analyzes an information image in the image. Meanwhile, coordinates within the document are inserted into the information image. Accordingly, the information image is analyzed to chronologically extract the interested coordinates, so that written coordinates (stroke information) may be extracted. A printing medium ID may also be extracted.

When analyzing the information image, the information image analysis module 120 extracts an error rate of analysis of a pixel cluster and a size of a pixel cluster as analysis results. An error rate is a proportion between the number of pixel clusters targeted to be analyzed and the number of pixel clusters that could not have been analyzed, or a proportion between the number of pixel clusters that could have been analyzed and the number of pixel clusters that could not have been analyzed. A size of a pixel cluster may be an image itself of a read pixel cluster, or the number of pixels of a vertical length and a horizontal width of the pixel cluster.

The clock module 130 is connected to the scan date and time extraction module 140. The clock module 130 measures present date and time and is synchronized with a clock of the image processing device 200. Meanwhile, date and time may include a year, a minute, a second, and a unit less than a second, in addition to a date and an hour. If comparison with print date and time is possible, date and time may include only a date or an hour.

The scan date and time extraction module 140 is connected to the clock module 130 and the output module 160. The scan date and time extraction module 140 extracts a date and time when the information image scan module 110 scans an information image, from the clock module 130.

The pen inclination detection module 150 is connected to the output module 160. The pen inclination detection module 150 detects inclination of the digital pen 100. For example, the pen inclination detection module 150 may be realized by a gyro sensor, an acceleration sensor, a magnetic sensor, or others.

The output module 160 is connected to the information image analysis module 120, the scan date and time extraction module 140, and the pen inclination detection module 150. As a result of the analysis of the information image by the information image analysis module 120, the output module 160 outputs a scan date and time detected by the scan date and time extraction module 140, and inclination of the digital pen 100 detected by the pen inclination detection module 150, to transmit them to the image processing device 200. The outputting may be outputting through communication (any one of wired and wireless communications) or storage in a memory medium (e.g., a USB memory). The output module 160 may output a printing medium ID extracted by the information image analysis module 120.

Meanwhile, the stroke information extracted by the information image analysis module 120 is output to the information processing device (which may be in the image processing device 200, or may be another information processing device different from the image processing device 200) using the stroke information.

Figure 2:
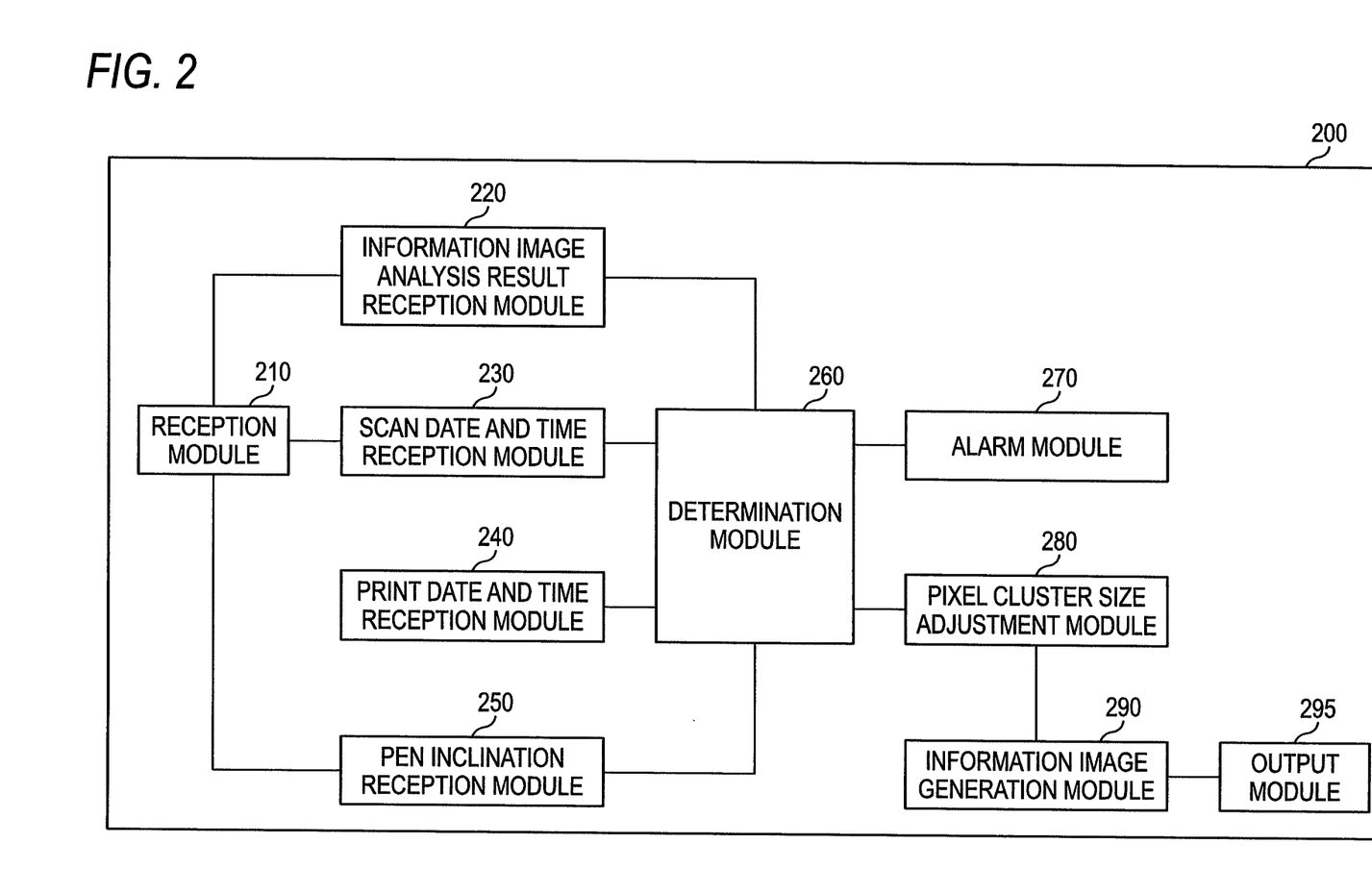
FIG. 2 is a conceptual module configuration view for a configuration example of an exemplary embodiment (image processing device) of the present invention.

FIG. 2 is a conceptual module configuration view for a configuration example of an exemplary embodiment (image processing device) of the present invention.

The image processing device 200 outputs a document having an information image by adjusting a pixel cluster constituting the information image. As illustrated in the example of FIG. 2, the image processing device 200 has a reception module 210, an information image analysis result reception module 220, a scan date and time reception module 230, a print date and time extraction module 240, a pen inclination reception module 250, a determination module 260, an alarm module 270, a pixel cluster size adjustment module 280, an information image generation module 290, and an output module 295.

The reception module 210 is connected to the information image analysis result reception module 220, the scan date and time reception module 230, and the pen inclination reception module 250. The reception module 210 receives information output by the output module 160. When the digital pen 100 transmits information through communication, the reception module 210 receives the information. When information is stored in a memory medium, the reception module 210 reads the information from the memory medium. The reception module 210 transmits a result of analysis by the information image analysis module 120 to the information image analysis result reception module 220. The reception module 210 transmits a scan date and time extracted by the scan date and time extraction module 140 to the scan date and time reception module 230. The reception module 210 transmits inclination of the digital pen 100 detected by the pen inclination detection module 150 to the pen inclination receiving module 250. The reception module 210 may receive a printing medium ID from the digital pen 100.

The information image analysis result reception module 220 is connected to the reception module 210 and the determination module 260. The information image analysis result reception module 220 receives an analysis result of an information image scanned by the digital pen 100.

The scan date and time reception module 230 is connected to the reception module 210 and the determination module 260. The scan date and time reception module 230 receives a date and time when the digital pen 100 scans an information image.

The pen inclination reception module 250 is connected to the reception module 210 and the determination module 260. The pen inclination reception module 250 receives inclination when the digital pen 100 scans an information image.

Figure 9:
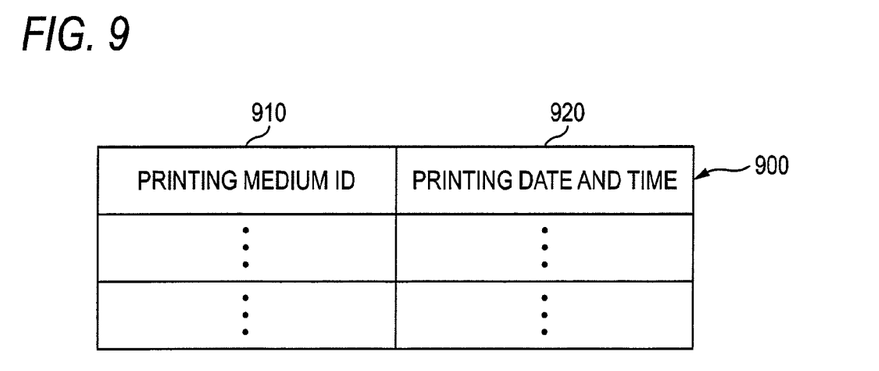
FIG. 9 is an explanation view showing a data structure example of a print date and time table.

The print date and time extraction module 240 is connected to the determination module 260. By using a printing medium ID received by the reception module 210, the print date and time extraction module 240 extracts a date and time when a printing medium presented by the printing medium ID is printed. For example, by using a print date and time table 900, the print date and time extraction module 240 extracts a print date and time corresponding to a printing medium ID. FIG. 9 is an explanation view showing a data structure example of the print date and time table 900. The print date and time table 900 has a printing medium ID section 910, and a print date and time section 920. The printing medium ID section 910 stores a printing medium ID for uniquely identifying a printing medium in an exemplary embodiment of the present invention. The print date and time section 920 stores a date and time when a printing medium presented by the printing medium ID is printed. Meanwhile, the print date and time table 900 may be in the print date and time extraction module 240 or stored in an information processing device capable of communicating with the image processing device 200.

The determination module 260 is connected to the information image analysis result reception module 220, the scan date and time reception module 230, the print date and time extraction module 240, the pen inclination reception module 250, the alarm module 270, and the pixel cluster size adjustment module 280. The determination module 260 determines whether or not to adjust a size of a pixel cluster constituting an information image, based on an analysis result received by the information image analysis result reception module 220, inclination received by the pen inclination reception module 250, and whether a scan date and time received by the scan date and time reception module 230 is within a predetermined time period from a print date and time extracted by the print date and time extraction module 240. Meanwhile, the determination module 260 may determine whether or not to adjust a size of a pixel cluster constituting an information image, only based on whether a scan date and time received by the scan date and time reception module 230 is within a predetermined time period from a print date and time extracted by the print date and time extraction module 240. Additionally, the determination module 260 may determine whether or not to adjust a size of a pixel cluster constituting an information image, by adding any one or both of an analysis result received by the information image analysis result reception module 220, and inclination received by the pen inclination reception module 250.

The following 4 matters are determined.

(a) Analysis result received by the information image analysis result reception module 220;

(b) Inclination of the digital pen 100 received by the pen inclination reception module 250;

(c) Scan date and time received by the scan date and time reception module 230; and (d) Print date and time extracted by the print date and time extraction module 240.

Determination is performed as follows:

(A1) It is determined whether an error rate in an analysis result is higher than a predetermined value. If an error rate is not high, it is unnecessary to adjust a size of a pixel cluster. If an error rate is high, there is a possibility that a size of a pixel cluster is adjusted.

(A2) It is determined whether inclination of the digital pen 100 is within a predetermined range. If inclination of the digital pen 100 is within a predetermined range, the pen is properly being held. If inclination of the digital pen 100 is beyond a predetermined range, the pen is not properly being held.

(A3) It is determined whether a scan date and time is within a predetermined time period from a print date and time. If a long time has elapsed after a print date and time, the scan date and time may not indicate the present state of the printer. Thus, if the scan date and time is not within a predetermined time period from a print date and time, a size of a pixel cluster should not be adjusted.

For example, it is determined that a size of a pixel cluster should be adjusted in the following cases: where it has been determined in (A1) that an error rate is higher than a predetermined value; it has been determined in (A2) that inclination of the digital pen 100 is within a predetermined range; and it has been determined in (A3) that a scan date and time is within a predetermined time period from a print date and time.

The determinations in (A1) and (A2) are the same as described above. However, the case where a size of a pixel cluster should be determined may include the case where it is set to not generate an alarm, and it has been determined that inclination of the digital pen 100 is beyond a predetermined range, in (A2). That is, the case where it is determined that a size of a pixel cluster should be adjusted corresponds to the case where a user does not correct a method of holding the digital pen 100, and the case where the digital pen 100 is inclined beyond an appropriate inclination range.

Meanwhile, the determinations in (A1), (A2), and (A3) may be performed in any order or in parallel.

The foregoing determinations may be only (A3), a combination of (A3) and (A1), a combination of (A3) and (A2), or a combination (A3), (A1), and (A2).

The alarm module 270 is connected to the determination module 260. If the determination module 260 determines that inclination is beyond a predetermined range, the alarm module 270 generates an alarm to a user of the digital pen 100. Meanwhile, the device may generate an alarm, or the digital pen 100 may generate an alarm. The alarm module 270 may be in the digital pen 100. A type of an alarm to be generated may be a sound (alarm sound, alarming by voice, or others), light (flickering of a light source, output of a predetermined color, or others), display, vibration, or others.

If the alarm module 270 is set to generate an alarm, the alarm module 270 may generate an alarm to a user of the digital pen 100. Regarding the case where the alarming module 270 is set to generate an alarm, if a flag (a variable in a storing device) is provided, and the flag is a predetermined value, it may be determined that the alarm module 270 has been set to generate an alarm. The flag may be set by a user or predetermined.

The pixel cluster size adjustment module 280 is connected to the determination module 260, and the information image generation module 290. If the determination module 260 determines that a size of a pixel cluster should be adjusted, the pixel cluster size adjustment module 280 adjusts a size of a pixel cluster constituting an information image, based on an analysis result received by the information image analysis result reception module 220 or inclination of the digital pen 100 received by the pen inclination reception module 250. Any one or both of the analysis result and the inclination of the digital pen 100 may be used.

An analysis result includes a size of a pixel cluster. If a size of a pixel cluster is larger than a predetermined value, the size of the pixel cluster is preferably adjusted to become small. If a size of a pixel cluster is smaller than a predetermined value, the size of the pixel cluster is preferably adjusted to become large.

If inclination of the digital pen 100 is used, a size of a pixel cluster is adjusted to offset variation of the size of the pixel cluster caused by the inclination. For example, if inclination of the digital pen 100 is toward a direction causing a size of a pixel cluster to be expanded, the size of the pixel cluster is preferably adjusted by subtracting the size expanded by the inclination. Likewise, if inclination of the digital pen 100 is toward a direction causing a size of a pixel cluster to be reduced, the size of the pixel cluster is preferably adjusted by adding the size reduced by the inclination.

If the alarm module 270 is set not to generate an alarm, the pixel cluster size adjustment module 280 may adjust a size of a pixel cluster constituting an information image, based on at least an analysis result received by the information image analysis result reception module 220. That is, the pixel cluster size adjustment module 280 adjusts a size of a pixel cluster constituting an information image without using inclination of the digital pen 100. This is because inclination of the digital pen 100 is not corrected.

The pixel cluster size adjustment module 280 adjusts a size of a pixel cluster constituting an information image, based on a time period between a scan date and time received by the scan date and time reception module 230 and a print date and time extracted by the print date and time extraction module 240. That is, the pixel cluster size adjustment module 280 adjusts a size of a pixel cluster by weighting a time period from a print date and time to a scan date and time. For example, if the time period is shortened, adjustment may be reduced (to reduce a difference between a size of a pixel cluster prior to adjustment and a size of a pixel cluster after adjustment). If the time period is lengthened, adjustment may increase (to increase a difference between a size of a pixel cluster prior to adjustment and a size of a pixel cluster after adjustment).

The information image generation module 290 is connected to the pixel cluster size adjustment module 280 and the output module 295. The information image generation module 290 generates an information image constituted by a pixel cluster adjusted by the pixel cluster size adjustment module 280. Information inserted into an information image includes at least location information. Additionally, for example, a printing medium ID, a document ID, a page ID, and others are included.

The output module 295 is connected to the information image generation module 290. The output module 295 outputs a document, in which an information image generated by the information image generation module 290 is combined. The outputting an image includes, for example, printing by means of a printing device such as a printer, and transmitting an image by means of an image transmitting device such as a facsimile machine. A printing medium is mostly a paper, but materials such as plastics may be used if they are of a paper shape.

Figure 3:
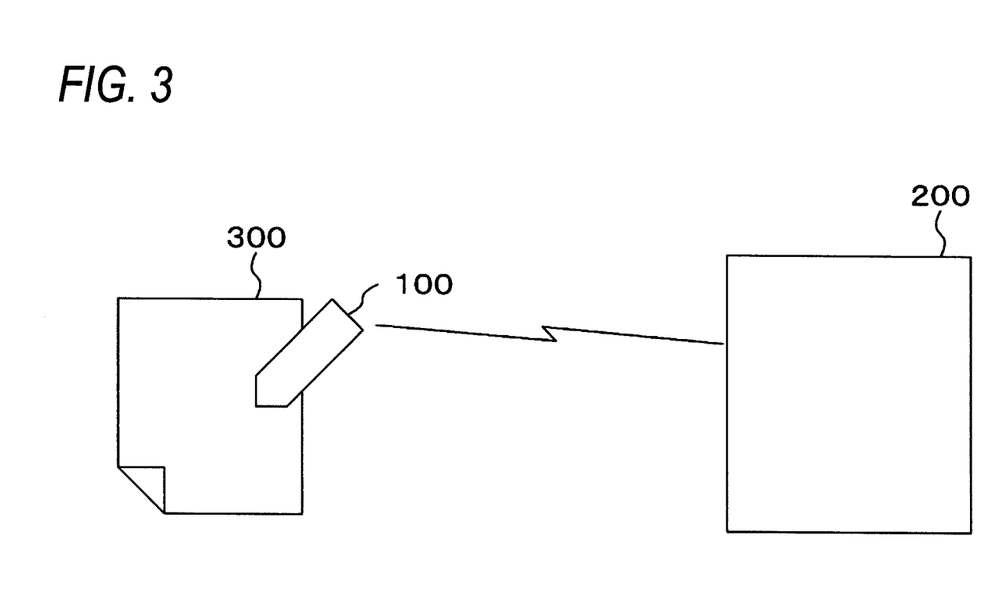
FIG. 3 is an explanation view showing a system configuration example for accomplishing an exemplary embodiment of the present invention.

FIG. 3 is an explanation view showing a system configuration example to accomplish an exemplary embodiment of the present invention.

The digital pen 100 scans an information image in the information image area document 300 at the end of the digital pen 100, by a user's writing. The digital pen 100 executes the processes that have been described, and transmits an analysis result, a scan date and time, and inclination of the digital pen 100 to the image processing device 200. The image processing device 200 receives the information transmitted from the digital pen 100, adjusts a size of a pixel cluster, and outputs a new information image area document 300.

Figure 6:
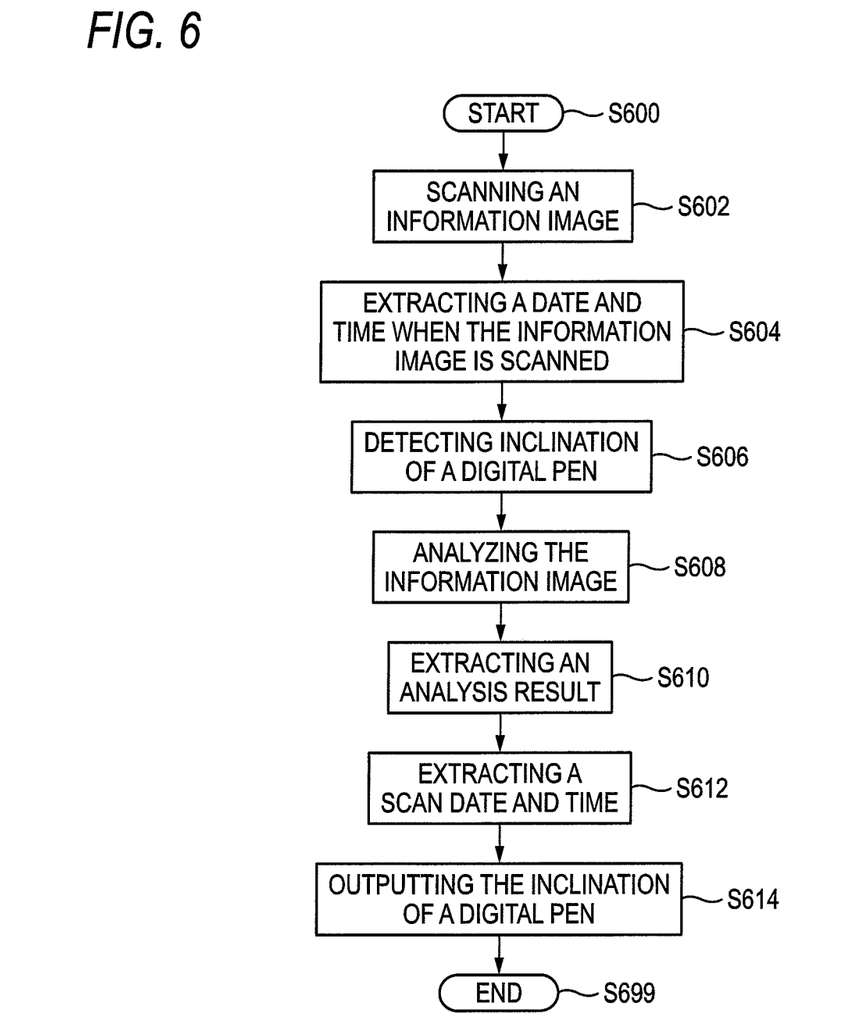
FIG. 6 is a flowchart showing a process example according to an exemplary embodiment (digital pen) of the present invention.

FIG. 6 is a flowchart showing a process example according to an exemplary embodiment (digital pen 100) of the present invention.

In S602, the information image scan module 110 scans an information image.

In S604, the scan date and time extraction module 140 extracts a date and time when an information image is scanned.

In S606, the pen inclination detection module 150 detects inclination of the digital pen 100.

In S608, the information image analysis module 120 analyzes an information image.

In S610, the output module 160 outputs an analysis result.

In S612, the output module 160 outputs a scan date and time.

In S614, the output module 160 outputs inclination of the digital pen 100.

Meanwhile, the processes from S602 to S606 may be executed in any order or in parallel. The processes from S610 to S614 also may be executed in any order or in parallel.

Figure 7:
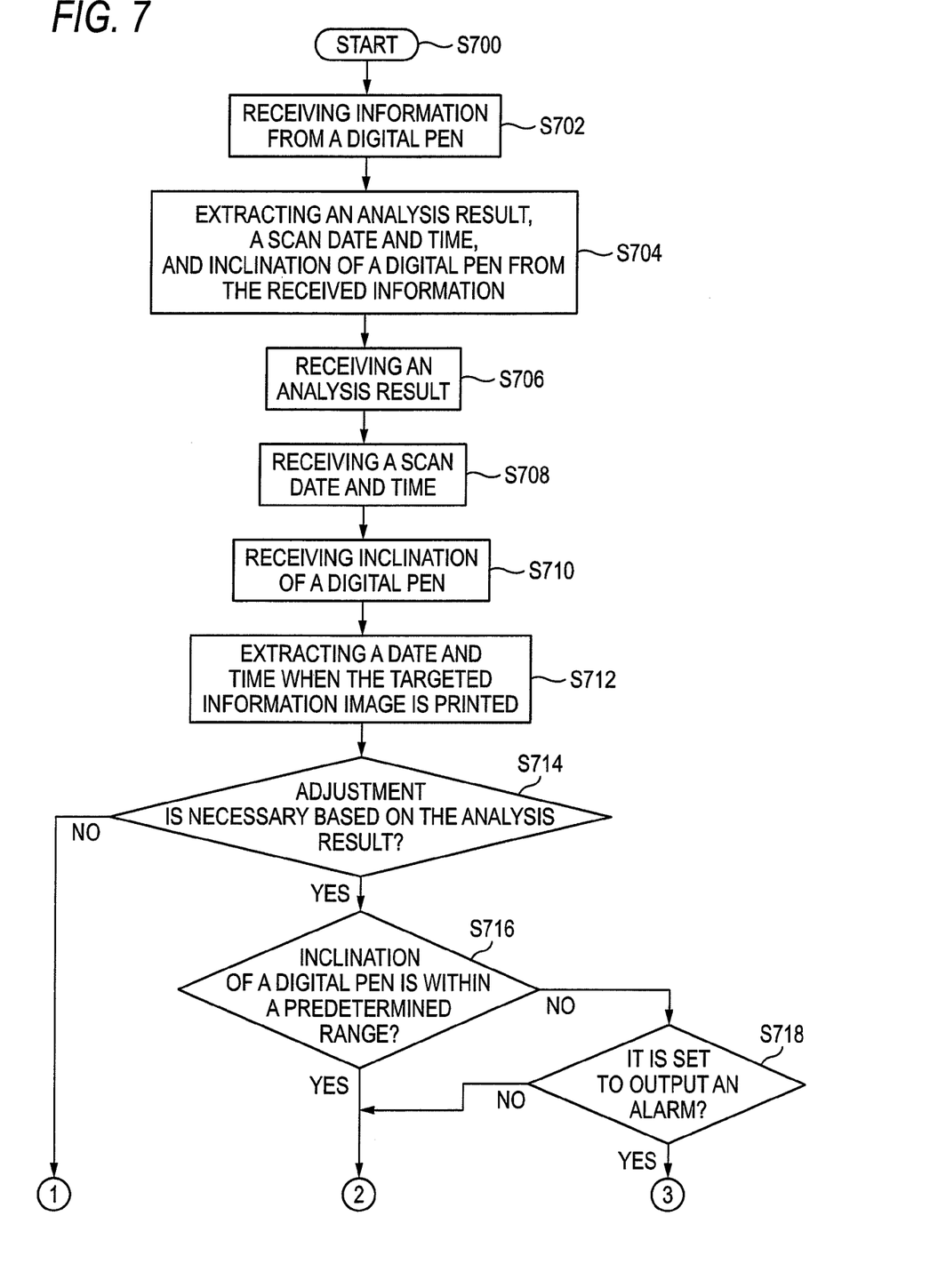
FIG. 7 is a flowchart showing a process example according to an exemplary embodiment (image processing device) of the present invention.
Figure 8:
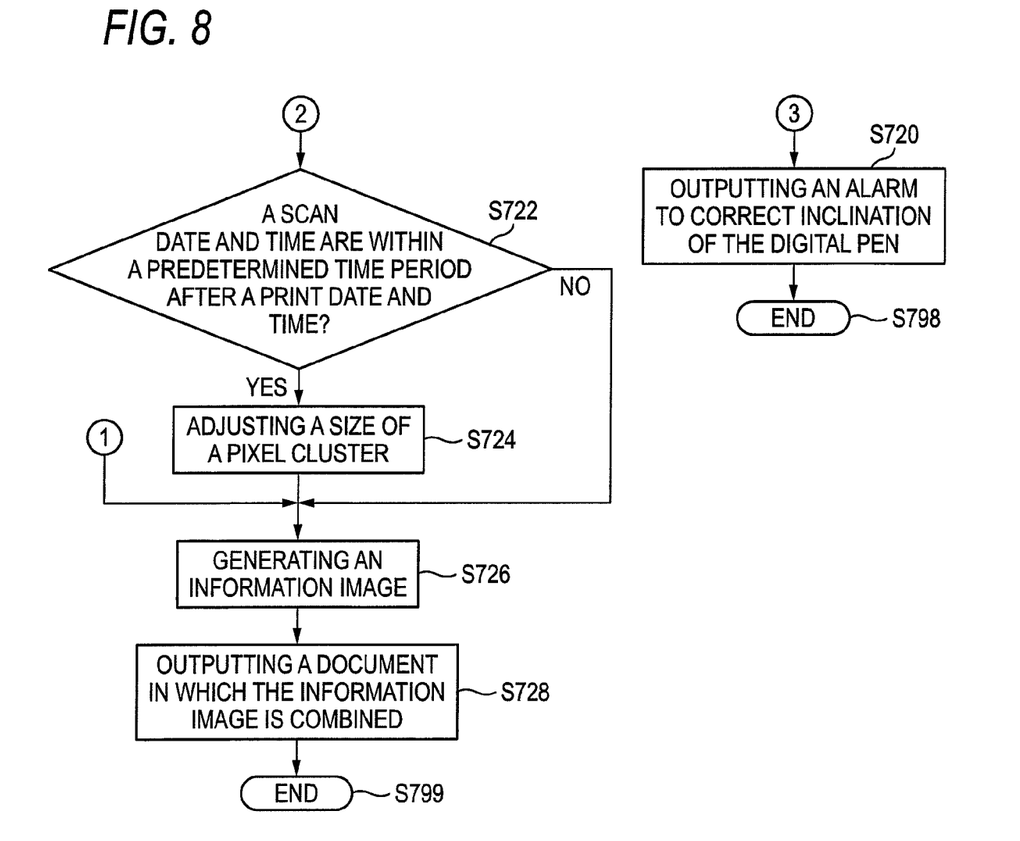
FIG. 8 is a flowchart showing a process example according to an exemplary embodiment (image processing device) of the present invention.

FIGS. 7 and 8 are flowcharts showing a process example according to an exemplary embodiment (image processing device 200) of the present invention.

In S702, the reception module 210 receives information from the digital pen 100.

In S704, the reception module 210 extracts an analysis result, a scan date and time, inclination of the digital pen 100 from the received information.

In S706, the information image analysis result reception module 220 receives the analysis result.

In S708, the scan date and time reception module 230 receives a scan date and time.

In S710, the pen inclination reception module 250 receives inclination of the digital pen 100.

In S712, the print date and time extraction module 240 extracts a date and time when a targeted information image is printed. For example, the print date and time extraction module 240 extracts a print date and time corresponding to a printing medium ID in the information received by the reception module 210 from the print date and time table 900.

In S714, the determination module 260 determines whether adjustment is necessary based on an analysis result. If adjustment is necessary, S716 is performed. Otherwise, S726 is performed.

In S716, the determination module 260 determines whether inclination of the digital pen 100 is within a predetermined range. If inclination of the digital pen 100 is within the range, S722 is performed. Otherwise, S718 is performed.

In S718, the determination module 260 determines whether it is set to output an alarm. If it is set to output an alarm, S720 is performed. Otherwise, S722 is performed.

In S720, the alarm module 270 outputs an alarm to correct inclination of the digital pen 100. As a result of the outputting, the image processing device 200 may generate an alarm, or the digital pen 100 may generate an alarm.

In S722, the determination module 260 determines whether a scan date and time are within a predetermined time period from a print date and time. If a scan date and time are within a predetermined time period, S724 is performed. Otherwise, S726 is performed.

Figure 10A:
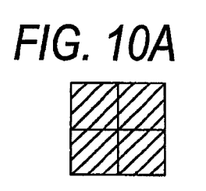
Figure 10B:
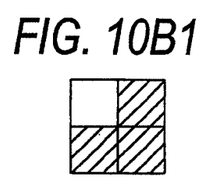
Figure 10B:
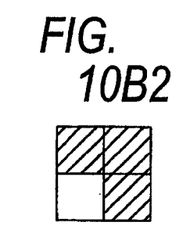
Figure 10B:
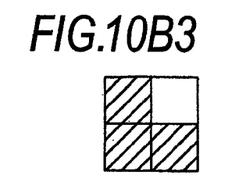
Figure 10B:
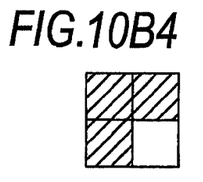
Figure 10B:
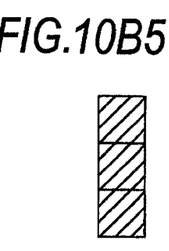
Figure 10B:
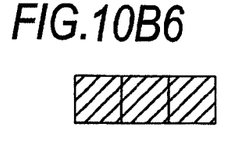
Figure 10C:
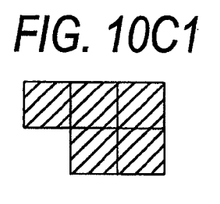
Figure 10C:
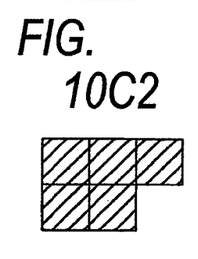
Figure 10C:
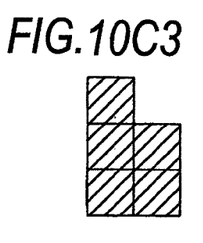
Figure 10C:
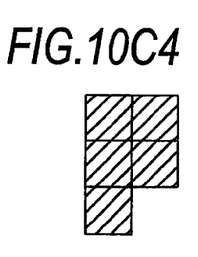
Figure 10C:
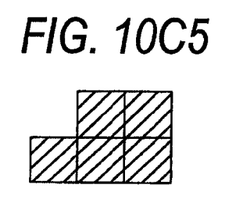
Figure 10C:
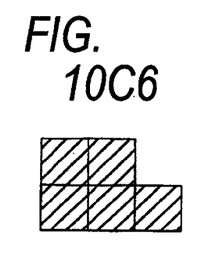
Figure 10C:
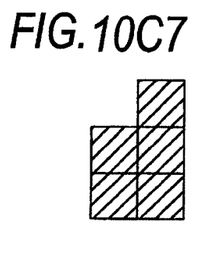
Figure 10C:
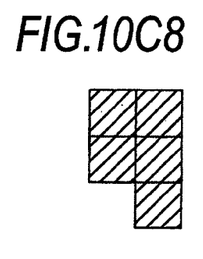

In S724, the pixel cluster size adjustment module 280 adjusts a size of a pixel cluster. For example, if a pixel cluster is made of 4 pixels according to the example of FIG. 10A, adjusting the size to be as small as ¾ means adjusting the pixel cluster to be a pixel cluster made of 3 pixels according to the examples of FIGS. 10B1 to 10B6. Selecting which one is determined depending on a shape or others of a scanned pixel cluster. For example, if an upper portion of a scanned pixel cluster is larger than a lower portion thereof, the pixel clusters according to the example of FIGS. 10B1 and 10B3 are selected. If a scanned pixel cluster is expanded in a horizontal direction, the pixel cluster according to the example of FIG. 10B5 is selected. Adjusting the size to be as large as 5/4 means adjusting the pixel cluster to be a pixel cluster made of 5 pixels according to the examples of FIGS. 10C1 to 10C8. Selecting which one is determined depending on a shape or others of a scanned pixel cluster. For example, if an upper portion of a scanned pixel cluster is larger than a lower portion thereof, the pixel clusters according to the examples of FIGS. 10C5 and 10C6 are selected. If a scanned pixel cluster is expanded in a horizontal direction, the pixel clusters exemplified in FIGS. 10C3, 10C4, 10C7, and 10C8 are selected.

In S726, the information image generation module 290 generates an information image.

In S728, the output module 295 outputs a document, in which an information image is combined.

Meanwhile, the processes from S706 to S712 may be executed in any order or in parallel. The determination processes in S714, S716, and S722 may also be executed in any order or in parallel, if any one of S724, S720 or S726 is executed as a result of the three determination processes.

In addition, any one or both of S714 and S716 may not be performed.

Figure 11:
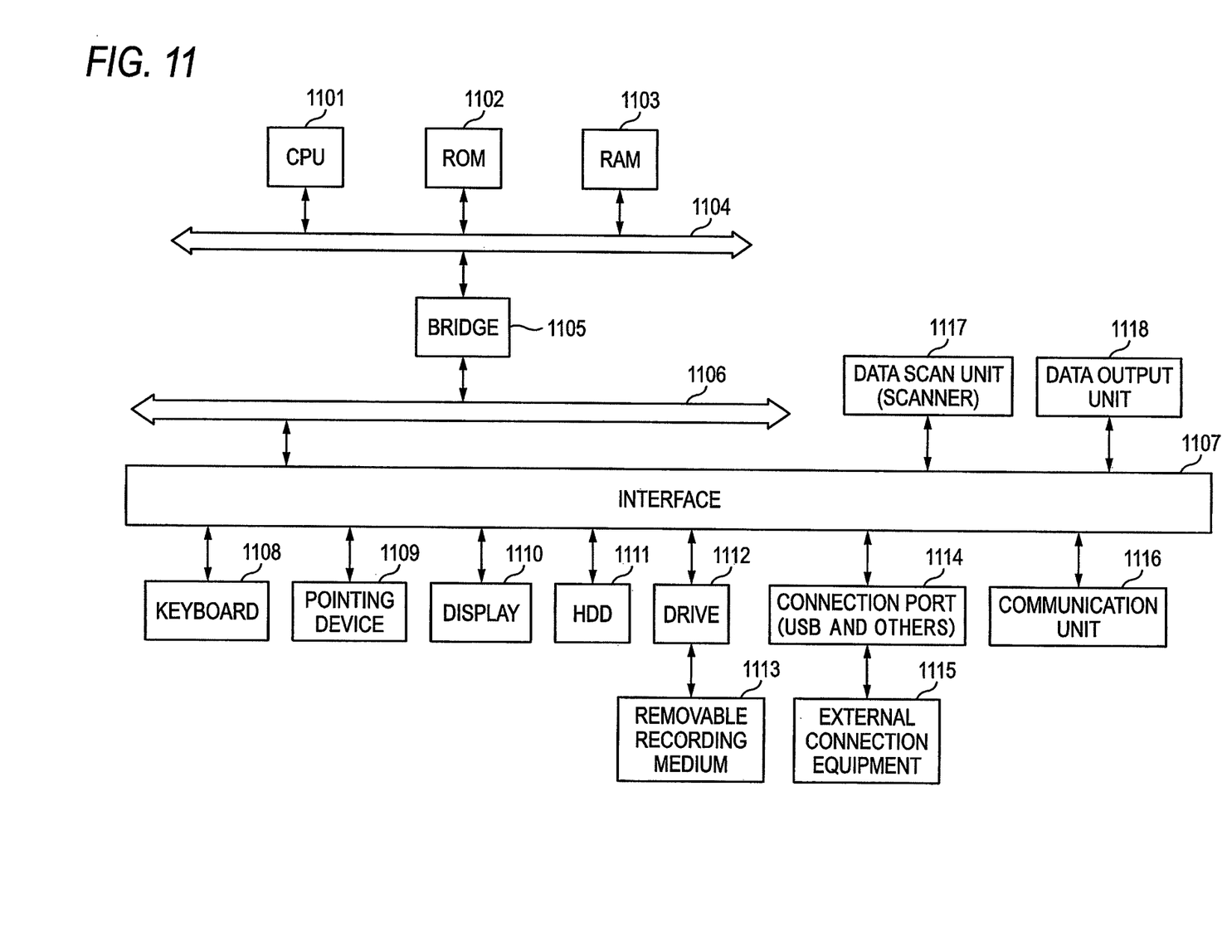
FIG. 11 is a block diagram showing a computer hardware configuration example for accomplishing an exemplary embodiment of the present invention.

A hardware configuration example of the image processing device of an exemplary embodiment of the present invention will be described with reference to FIG. 11. The configuration shown in FIG. 11 is configured, for example, by a personal computer (PC) or others, and relates to a hardware configuration example including a data scan unit 1117 such as a scanner, and a data output unit 1118 such as a printer.

A CPU 1101 is a control module for executing processes in accordance with a computer •program describing an execution sequence of the various modules that have been described, i.e., the information image analysis result reception module 220, the scan date and time reception module 230, the print date and time extraction module 240, the pen inclination reception module 250, the determination module 260, the alarm module 270, the pixel cluster size adjustment module 280, the information image generation module 290, and others.

A ROM (Read Only Memory) 1102 stores programs, calculation parameters, and others, which are used in the CPU 1101. A RAM 1103 stores programs used for execution of the CPU 1101 or parameters properly varying in the execution. These components are connected to each other by a host bus 1104 configured by a CPU bus or others.

The host bus 1104 is connected to an external bus 1106 such as a PCI (Peripheral Component Interconnect/Interface) bus through a bridge 1105.

A pointing device 1109 such as a keyboard 1108 and a mouse is an input device operated by an operator. A display 1110 includes a liquid crystal display device, a CRT (Cathode Ray Tube), and others, and displays various information as texts or image information.

A HDD (Hard Disk Drive) 1111 has a hard disc, and drives the hard disc to record or replay a program or information executed by the CPU 1101. In the hard disc, an information image, a document, the print date and time table 900, and others are stored. Furthermore, various computers programs such as various data processing programs are stored.

A drive 1112 reads data or programs recorded in a removable record medium 1113 such as a magnetic disk, an optical disc, an optical magnetic disk, or a semiconductor memory, which is mounted therein. The drive 1112 supplies the data or programs to RAM 1103 connected through the interface 1107, the external bus 1106, the bridge 1105, and the host bus 1104. The removable record medium 1113 also may be used as a data recording area like the hard disc.

A connection port 1114 is a port for connecting external connection equipment 1115, and has a connection unit such as USB or IEEE1394. The connection port 1114 is connected to the CPU 1101 or others through the interface 1107, the external bus 1106, the bridge 1105, the host bus 1104, or others. A communication unit 1116 is connected to a network to execute a process for data communication with the outside. A data reading unit 1117 is, for example, a scanner, and executes a process for scanning a document. A data output unit 1118 is, for example, a printer, and executes a process for outputting document data.

Meanwhile, the hardware configuration of the image processing device illustrated in FIG. 11 shows one configuration example. An exemplary embodiment of the present invention is not limited to the configuration illustrated in FIG. 11, and includes any configuration, which is capable of executing the modules described in an exemplary embodiment of the present invention. For example, some of the modules may be configured by their exclusive hardware (e.g., Application Specific Integrated Circuit: ASIC). Some of the modules may be within an external system and in the form connected by a communication circuit. Additionally, a plurality of the systems illustrated in FIG. 11 may be connected by a communication circuit so that they mutually corporate with one another upon operation. Also, the systems may be incorporated into a copier, a facsimile machine, a scanner, a printer, a multifunction printer (an image processing device having at least two functions of a scanner, a printer, a copier, a facsimile machine, and others), or others.

The exemplary embodiment that has been described presents the print date and time table 900. However, a print date and time may be inserted into an information image. That is, the information image generation module 290 generates an information image including a print date and time. The output module 295 outputs a document, in which the information image is combined. The information image analysis module 120 of the digital pen 100 extracts the print date and time from the information image. The output module 160 outputs the print date and time to the image processing device 200. The reception module 210 receives the print date and time. The print date and time extraction module 240 preferably extracts the print date and time.

The print date and time table 900 may store a corresponding printing device ID for uniquely identifying a printing device, which has printed a printing medium presented by the printing medium ID. This is because there may be a plurality of printing devices. A size of a pixel cluster adjusted by the pixel cluster size adjustment module 280 is involved in the printing device that has printed the printing medium.

Meanwhile, the programs that have been described may be stored in a recording medium or provided by a communication means. In such case, the programs described above may be treated as an invention for a "computer readable recording medium having a program recorded therein."

A "computer readable recording medium having a program recorded therein" means a computer readable recording medium having a program recorded therein, which is used for installation, execution, distribution, and others of a program.

Meanwhile, the recording medium includes, for example, a Digital Versatile Disc (DVD), "DVD-R, DVD-RW, and DVDRAM, etc.," which are standards adopted in the DVD forum, "DVD+R, and DVD+RW, etc.," which are standards adopted in DVD+RW, a compact disc (CD), Read Only Memory (CD-ROM), CD Recordable (CD-R), CD Rewritable (CD-RW), blue ray•disc (Blu-ray Disc (registered trademark)), an optical magnetic disc (MO), a flexible disk (FD), a magnetic tape, a hard disc, read only memory (ROM), electrically removable and rewritable read only memory (EEPROM (registered trademark)), flash memory, random access memory (RAM), and others.

The programs or some of the programs may be recorded in the recording medium to be preserved or distributed. The programs or some of the programs may be transmitted through communication, for example, by using transmission mediums such as a wired network, a wireless communication network, or a combination thereof, which is used for local area network (LAN), metropolitan area network (MAN), wide area network (WAN), Internet, Intranet, Extranet, and others, or may be carried by using a carrier.

The programs may be part of other programs or recorded in a recording medium together with a separate program. The programs may be divided to be recorded in a plurality of recording mediums. The programs may be recorded in any restorable state such as a compressed or encoded state.

The foregoing description of the exemplary embodiment of the present invention has been provided for the purpose of illustration and description. It is not intended to be exhaustive or to limit the invention to the precise forms disclosed. Obviously, many modifications and various will be apparent to practitioners skilled in the art. The embodiments were chosen and described in order to best explain the principles of the invention and its practical application, thereby enabling other skilled in the art to understand the invention for various embodiments and with the various modifications as are suited to the particular use contemplated. It is intended that the scope of the invention be defined by the following claims and their equivalents.

DESCRIPTION OF REFERENCE NUMERALS

100 . . . digital pen
110 . . . information image scan module
120 . . . information image analysis module
130 . . . clock module
140 . . . scan date and time extraction module
150 . . . pen inclination detection module
160 . . . output module
200 . . . image processing device
210 . . . reception module
220 . . . information image analysis result reception module
230 . . . scan date and time reception module
240 . . . print date and time extraction module
250 . . . pen inclination reception module
260 . . . determination module
270 . . . alarm module
280 . . . pixel cluster size adjustment module
290 . . . information image generation module
295 . . . output module
511 . . . lead
512 . . . image scan module
513 . . . control/transmission module

What is claimed is:

1. An image processing device comprising:
an analysis result reception unit that receives an analysis result of an information image scanned by an information image scan unit;
an inclination reception unit that receives inclination when the information image scan unit scans the information image;
a date and time reception unit that receives a date and time when the information image scan unit scans the information image;
a date and time extraction unit that extracts a date and time when the information image scanned by the information image scan unit is printed;
a determination unit that determines whether or not to adjust a size of a pixel cluster constituting the information image, based on whether the date and time received by the date and time reception unit is within a predetermined time period from the date and time extracted by the date and time extraction unit;
an adjustment unit, when the determination unit determines that the size of the pixel cluster should be adjusted, adjusts the size of the pixel cluster constituting an information image based on an at least one of the analysis result received by the analysis result reception unit and inclination received by the inclination reception unit;
an information image generation unit that generates an output information image constituted by the pixel cluster adjusted by the adjustment unit; and
an output unit that outputs a document in which the output information image generated by the information image generation unit is combined.

2. The image processing device according to claim 1, wherein the determination unit determines whether the inclination received by the inclination reception unit is within a predetermined range, and
the image processing device further comprises an alarm unit, when the determination unit determines that inclination is beyond a predetermined range, an alarm is generated to a user of the information image scan unit.

3. The image processing device according to claim 2, wherein when the alarm unit is set to generate an alarm, the alarm unit generates an alarm to a user of the information image scan unit,
when the alarm unit is set not to generate an alarm, the adjustment unit adjusts the size of the pixel cluster constituting an information image, based the analysis result received by the analysis result reception unit.

4. The image processing device according to claim 1, wherein the adjustment unit adjusts the size of the pixel cluster constituting an information image, based on time duration between the date and time received by the date and time reception unit and the date and time extracted by the date and time extraction unit.

5. An image processing system comprising:
an information image scan device includes:
an information image scan unit that scans an information image,
an information image analysis unit that analyze the information image scanned by the information image scan unit,
an inclination detection unit that detects inclination when the information image scan unit scans the information image, and
a date and time extraction unit that extracts a date and time when the information image scan unit scans the information image, and
the image processing device according to claim 1,
wherein the image processing device is connected to the information image scan device,
the analysis result reception unit of the image processing device receives a result of analysis by the information image analysis unit,
the inclination reception unit of the image processing device receives inclination detected by the inclination detection unit, and
the date and time reception unit of the image processing device receives a date and time extracted by the date and time extraction unit.

6. A non-transitory computer readable medium storing a program causing a computer to execute a process for image processing, the process comprising:
receiving an analysis result of an information image scanned by an information image scan unit;
receiving inclination when the information image scan unit scans the information image;
receiving a date and time when the information image scan unit scans the information image;
extracting a date and time when the information image scanned by the information image scan unit is printed;
determining whether or not to adjust a size of a pixel cluster constituting the information image, based on whether the received date and time is within a predetermined time period from the extracted date and time;
when the determination unit determines that the size of the pixel cluster should be adjusted, adjusting the size of the pixel cluster constituting an information image based on the analysis result received by the analysis result reception unit and inclination received by the inclination reception unit;
generating an output information image constituted by the pixel cluster adjusted by the adjustment unit; and outputting a document in which the output information image generated by the information image generation unit is combined.

\* \* \* \* \*